(12) United States Patent
Tewes et al.

(10) Patent No.: US 6,396,580 B1
(45) Date of Patent: May 28, 2002

(54) METHOD AND DEVICE FOR POLYCHROMATIC FLUORESCENCE CORRELATION SPECTROSCOPY

(75) Inventors: Michael Tewes, Hürth; Jörg Langowski, Heidelberg, both of (DE)

(73) Assignee: Deutsches Krebsforschungszentrum Stiftung Des, Heidelberg (DE)

( * ) Notice: Subject to any disclaimer, the term of this patent is extended or adjusted under 35 U.S.C. 154(b) by 0 days.

(21) Appl. No.: 09/485,586

(22) PCT Filed: Aug. 11, 1998

(86) PCT No.: PCT/DE98/02307

§ 371 (c)(1),
(2), (4) Date: May 12, 2000

(87) PCT Pub. No.: WO99/09393

PCT Pub. Date: Feb. 25, 1999

(30) Foreign Application Priority Data

Aug. 13, 1997 (DE) ......................... 197 35 119

(51) Int. Cl.[7] ................................. G01N 1/10
(52) U.S. Cl. ........................ 356/246; 356/244
(58) Field of Search ................. 356/440, 246, 356/244; 422/104, 82.05

(56) References Cited

U.S. PATENT DOCUMENTS

| | | | | |
|---|---|---|---|---|
| 4,088,407 A | * | 5/1978 | Schoeffel et al. | 356/246 |
| 4,188,542 A | * | 2/1980 | Hogg et al. | 356/39 |
| 4,199,686 A | * | 4/1980 | Brunsting et al. | 250/459 |
| 4,273,443 A | * | 6/1981 | Hogg | 356/343 |
| 4,606,636 A | * | 8/1986 | Monin et al. | 356/338 |
| 4,657,397 A | * | 4/1987 | Oehler et al. | 356/414 |
| 4,943,159 A | * | 7/1990 | Oetliker et al. | 356/338 |
| 5,430,541 A | * | 7/1995 | Sapp et al. | 356/246 |
| 5,484,571 A | * | 1/1996 | Pentoney, Jr. et al. | 422/82.08 |
| 5,614,726 A | * | 3/1997 | Kaye et al. | 356/246 |

FOREIGN PATENT DOCUMENTS

| | | | | |
|---|---|---|---|---|
| EP | 0 106 662 A2 | 4/1984 | | G01N/21/03 |
| WO | WO 94/16313 | 7/1994 | | G01N/21/64 |

* cited by examiner

Primary Examiner—Frank G. Font
Assistant Examiner—Roy M Punnoose
(74) Attorney, Agent, or Firm—Steven J. Hultquist; Marianne Fuierer

(57) ABSTRACT

In the procedure, the light beams are incident parallel to the transparent medium and are deflected toward a focal point inside the transparent medium. This avoids the use of refractive lens systems. The focusing lens system according to the invention enables the bundling of light beams of different wavelength to a point inside the sample.

This clearly simplifies the design and adjustment of a multicolor fluorescence correlation spectroscopy device.

20 Claims, 2 Drawing Sheets

METHOD AND DEVICE FOR POLYCHROMATIC FLUORESCENCE CORRELATION SPECTROSCOPY

FIELD OF THE INVENTION

The invention relates to a procedure and a device for fluorescence correlation spectroscopy, in particular for multicolor fluorescence correlation spectroscopy, during which light beams are focused in a transparent medium.

BACKGROUND OF THE INVENTION

In multicolor fluorescence correlation spectroscopy (FCS), as described by P. Schwille et al., Biophysical Journal, Vol. 72 (1997), 1878 to 1886 or M. Völcker et al. tm—Technisches Messen, 36 (1196, 128 to 135), molecular interactions are studied by marking two reactants with different fluorescent dyes and allowing them to freely diffuse in a liquid, transparent medium. The reactants generate fluctuations in fluorescent intensity while diffusing through the focal point that can be detected with a confocal lens system. If predominantly correlated intensity fluctuates are detected between the emission wavelengths of the two fluorogens, this points to a complexing between the two partners.

Given the varying excitation wavelengths of the fluorogens, use must be made of two laser wavelengths, which are focused on the smallest possible, identical volume in the sample. As a rule, microscope lenses with a high numerical aperture, i.e., large aperture ratio, are used to this end to achieve as small a focal point as possible on the one hand, and gather as much of the emitted light Another disadvantage to the available lens is that an optimal, diffraction-limited focal point is only ensured if the refractive index of the immersion medium and sample solution reflects the value for which the lens was optimized. Since fluorescence correlation spectroscopy is very sensitive to changes in focus volume, a change in the refractive index can have a highly adverse effect on the results. Among other things, changes in the refractive index can be caused by a change in the temperature of the sample or salts dissolved in the buffer, and hence in the parameters that are commonly varied in biochemical experiments. This problem is already encountered in single-color fluorescence correlation spectroscopy.

SUMMARY OF THE INVENTION

In terms of the procedure, the object of the invention is to develop a procedure and device that do not exhibit the described disadvantages.

This object is achieved by means of a generic procedure in which the light beams are incident on the transparent medium in an approximately perpendicular manner, and are only deflected toward the focal point inside the transparent medium.

DETAILED DESCRIPTION OF THE INVENTION

The invention is based on the knowledge that the known errors stem from the use of refractive lens systems. The angle of incidence and angle of reflection on a surface between two media are linked by the refractive index according to Snell's Law. If the refractive indices change owing to dispersion, i.e., a change in the refractive index with wavelength, or resulting from the use of other buffers, a change takes place in the beam path, and hence in the focus volume. This set of problems affects every beam path except for the light beams perpendicularly incident on the boundary surface. Only a light beam perpendicularly incident on the boundary surface passes the boundary surface without being deflected, independently of the refractive index. As a result of this knowledge, only reflective lens systems came to be used in the focusing arrangement to solve the task, and all light beams penetrate the boundary surfaces between different optical media only perpendicularly.

In this regard, the term "approximately perpendicular" is defined by the desired measuring accuracy. Deviations are possible within the framework of a desired measuring accuracy.

Hence, the described procedure enables a simple optimization of the used lens, and permits the focusing of laser beams with different wavelengths on an identical, as diffraction-limited as possible volume inside the sample.

One relatively easy way to realize the invention is to reflect the light beams inside the transparent medium toward the focal point.

In terms of the device, the object is achieved with a general device in which the sample vessel exhibits a focusing, metal-coated floor, wherein the focal point lies inside the sample vessel. In this case, the floor can be designed in such a way as to take the light beams penetrating into the sample vessel essentially parallel to each other and focus them essentially on the focal point.

This device makes it possible to use the sample vessel as a focusing element. The parallel light beams incident in the sample vessel are focused by its floor on a point. Since this point lies inside the sample vessel, there is no further deflection of the parallel incident light beams on the boundary surfaces between two media. The light beams only need to get into the sample once, and since parallel and perpendicular incident light beams are used here, they are not deflected when penetrating through the cover slip or making the transition between the cover slip and sample liquid. No boundary surfaces between different media need be overcome in the process of deflection inside the transparent sample.

It is advantageous if the sample vessel is saucer-shaped, and if the focal point lies inside the saucer. An optimal shape for the floor is achieved by giving the floor a parabolic or slightly elliptical shape.

To achieve a good measurement result, it is proposed that the floor be precisely fabricated to a fraction of the used wavelength. The high level of precision achievable with the device also requires that the metal-coated floor surface be accurately fabricated.

To ensure the long-term durability of the reflective metal coating, it is additionally proposed that the floor be metal-coated with a layer resistant to conventional buffer solutions.

Any material in which a fluorescence correlation spectroscopy can be performed may be used as the transparent medium. In particular, this can be a transparent fluid or transparent liquid or gel.

An embodiment of the device according to the invention is shown in a drawing in a comparison with a known device, and will be described in greater detail below.

Figure 1:
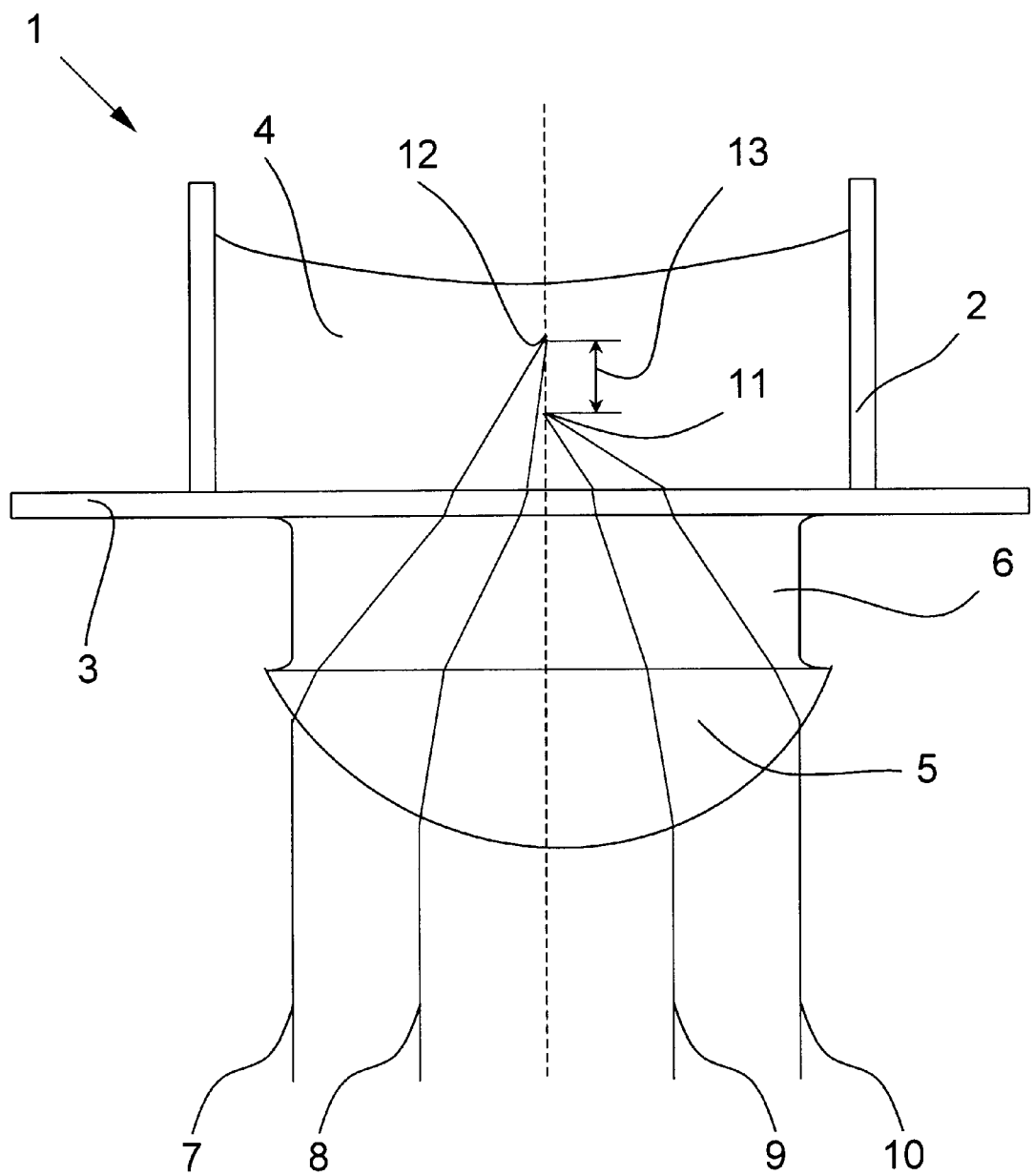
FIG. 1 is a diagrammatic view of a known device for multicolor fluorescence correlation spectroscopy.

The device 1 shown on FIG. 1 reflecting prior art consists of a cuvette 2, which stands on a cover slip 3 and contains the sample 4 in a buffer solution. Located under the cover slip 3 is the last lens 5 of an objective, while immersion liquid 6 is located between this last lens 5 and the cover slip 3.

Parallel light beams 7, 8, 9, 10 pass through the lens 5 into the immersion liquid 6 and travel on through the cover slip 3 into the buffer solution 4 located in the cuvette 2, where they converge in a focal point 11 or 12.

As a result of the different wavelengths of light beams 7, 8 or 9, 10, the beams are deflected differently at each boundary surface between two media, and hence converge at different focal points 11 or 12. The greater the distance 13 between focal point 11 and focal point 12, the more impaired the measurement.

The described device shows that light beams 7, 8, 9, 10 from lasers with different laser wavelengths have to pass through several boundary layers until the converge in a focal point 11 or 12 that corresponds to the wavelength of the respective light beam. These transitions greatly impair the measurement.

Figure 2:
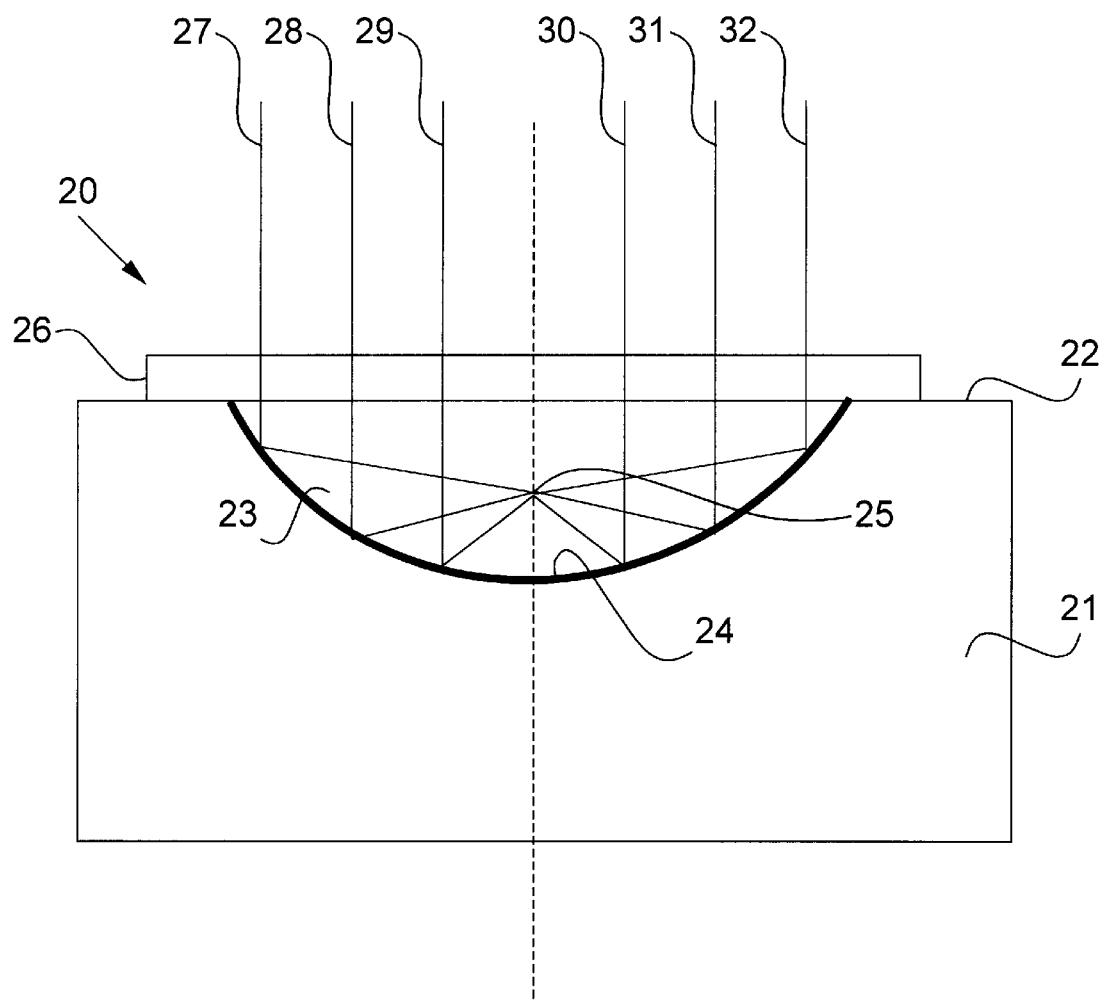
FIG. 2 is a diagrammatic view of device for multicolor fluorescence correlation spectroscopy according to the invention.

The device 20 shown on FIG. 2 consists of a block 21 with a flat surface 22 that incorporates a recess 23 as the sample vessel. This sample vessel is shaped like a parabola in cross section and has a metal-coated floor area 24 that acts as a parabolic mirror. This parabolic mirror is arranged in such a way that the focal point 25 of parallel incident light beams is located inside the recess 23.

Placed over the recess 23 on the flat surface 22 of the block 21 is a cover slip 26, which covers the recess 23 filled with the sample in buffer solution.

To optimize the focusing at point 25, the floor 24 is precisely fabricated to a fraction of the wavelengths of the used light beams, and the reflective material is adjusted to the buffer solutions in such a way as to prevent the buffer solutions or sample from changing the material.

When using the device 20 according to the invention, the sample is first poured into the recess of block 21 with a buffer solution. The completely filled recess 23 is then covered with the cover slip 26. As a result, parallel incident beams 27, 28, 29, 30, 31, 32 perpendicularly pass through the surface of the cover slip, penetrate into the sample arranged in the recess 23, going through the sample and arriving at the floor area 24. Since the light beam intersects each boundary surface between two media (air/cover slip) and (cover slip/sample) perpendicularly up to this point, it is not deflected. Only after hitting the metal-coated floor area 24 inside the sample liquid are the light beams 27 to 32 deflected toward the focal point 25. Since this reflection on the floor area 24 is independent of the wavelength of the light used, all light beams 27 to 32 converge in focal point 25, even if the light beams 27 to 32 exhibit different wavelengths.

Therefore, the advantage to the device is that the mirror ground to a parabolic or slightly elliptical shape serves as the focusing element and simultaneously as a holder for the sample, thereby essentially eliminating all imaging errors.

What is claimed is:

1. A method of eliciting fluorescence fluctuations in a sample, said method comprising:
   (a) combining potential reactants to yield a sample at a sample locus;
   (b) generating an array of parallel light beams; and
   (c) focusing the parallel light beams using a concave reflective surface to impinge the light beams at a focal point within the sample locus, to elicit a fluorescence response within the sample.

2. The method of claim 1 wherein:
   (a) the reflective concave surface is a reflective concave recess in a sample vessel;
   (b) the focal point lies within the concave recess along an axis of the concave recess;
   (c) the sample vessel comprises a cover arranged perpendicularly to the axis of the concave recess;
   (d) the sample is situated in the concave recess; and
   (e) the parallel beams of are reflected by the reflective concave recess to the focal point.

3. The method of claim 2 wherein the concave recess is parabaloidal.

4. The method of claim 2 wherein the concave recess is elliptical.

5. The method of claim 1 wherein each reactant is identified with a different fluorescent dye.

6. The method of claim 1 wherein the fluctuations in fluorescence comprise fluctuations in fluorescence intensity.

7. The method of claim 1 wherein predominantly correlated fluorescence intensity fluctuations indicate a complexing between two or more reactants.

8. The method of claim 1 wherein the sample comprises only two potential reactants.

9. The method of claim 1 wherein the sample is sufficiently transparent to permit sensing of fluctuations in fluorescence of reactants and/or products of such reactants.

10. An apparatus for conducting fluorescence correlation spectroscopic measurements, comprising:
    a sample vessel with a reflective concave recess with a focal point lying within the recess along an axis of the concave recess and a cover arranged perpendicularly to the axis of the concave recess; and
    a light source arranged to impinge an array of parallel light beams upon the sample vessel in a direction which is substantially parallel to the axis of the concave recess.

11. The apparatus of claim 10 wherein the concave recess of said sample vessel is parabaloidal.

12. The apparatus of claim 10 wherein the concave recess of said sample vessel is elliptical.

13. The apparatus of claim 10 further comprising a sample in the sample vessel, said sample comprising two or more potential reactants.

14. The apparatus of claim 13 wherein each potential reactant is identified with a different fluorescent dye.

15. The apparatus of claim 10 comprising a sample in the concave recess of said sample vessel, said sample comprising only two potential reactants, wherein each reactant is identified with a different fluorescent dye.

16. The apparatus of claim 10 wherein the reflective concave recess of said sample vessel comprises a reflective metal coating.

17. The apparatus of claim 16, wherein the reflective metal coating is resistant to corrosion by sample contained in said sample vessel.

18. The apparatus of claim 10, wherein the light source emits light having a wavelength and wherein the reflective concave recess of the sample vessel is fabricated such that the recess has a smooth surface on which any surface irregularities are a fraction of the size of the wavelength of the emitted light.

19. A method of eliciting fluorescence fluctuations in a sample, said method comprising:

(a) combining potential reactants to yield a sample at a sample locus;

(b) generating an array of parallel light beams; and (c) focusing the parallel light beams using a concave reflective surface to impinge the light beams at a focal point within the sample locus, to elicit a fluorescence response within the sample, wherein the concave reflective surface immediately contacts the sample and forms part of the sample locus.

20. A method of conducting polychromatic fluorescence correlation spectroscopy, said method comprising:

(a) combining two or more reactants to yield a sample at a sample locus, wherein said reactants are labeled with different fluorescent dyes;

(b) generating an array of parallel exciting light beams of two or more wavelengths; and (c) focusing the parallel light beams of two or more wavelengths, using a concave reflective surface to impinge the light beams at a focal point within the sample locus, to elicit a fluorescence response within the sample.

* * * * *